Figure 1:
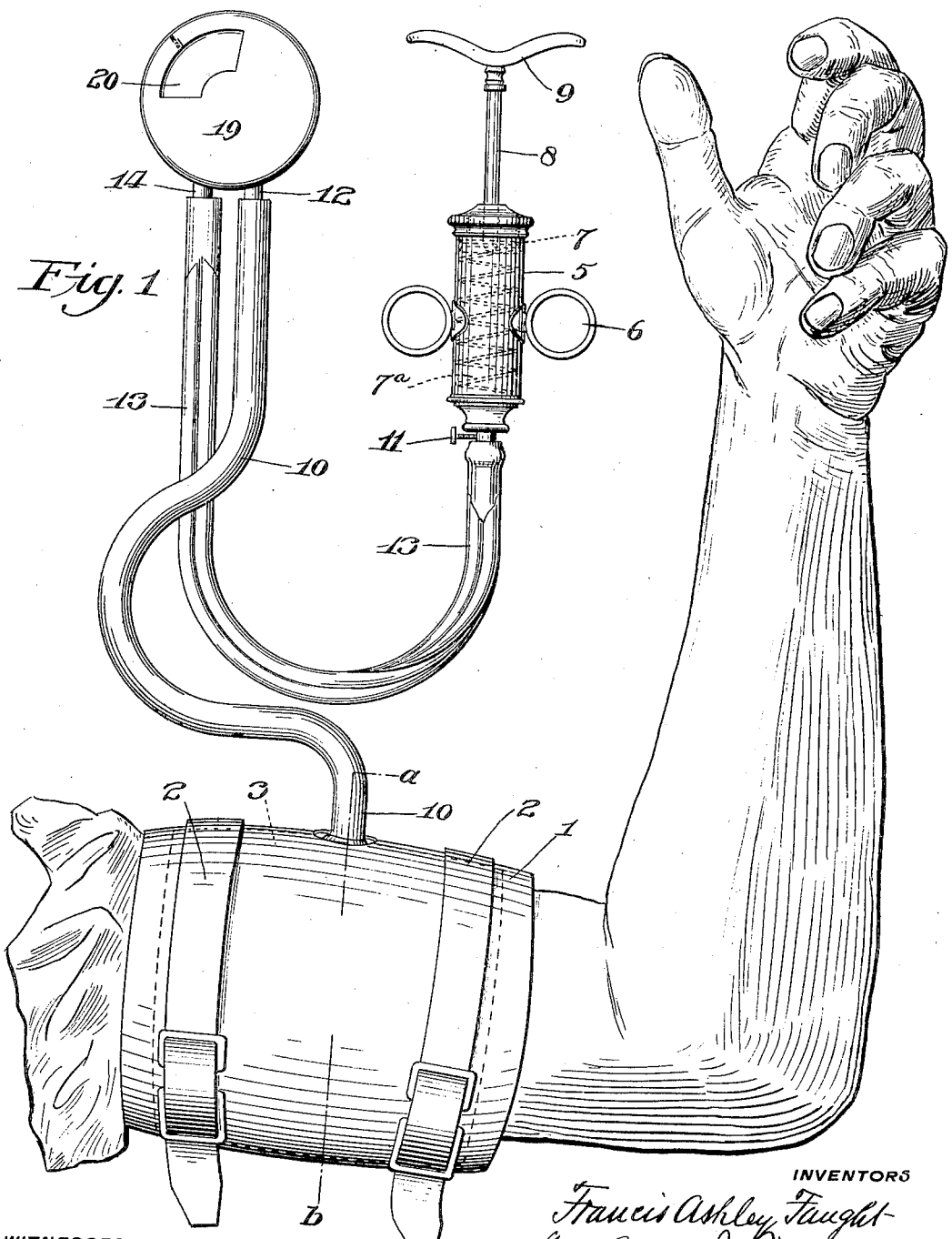

F. A. FAUGHT & C. J. PILLING.
APPARATUS FOR MEASURING AND INDICATING BLOOD PRESSURE.
APPLICATION FILED SEPT. 20, 1910.

1,089,122.

Patented Mar. 3, 1914.

3 SHEETS—SHEET 1.

WITNESSES

INVENTORS
Francis Ashley Faught
and Charles J. Pilling
BY
ATTORNEY

F. A. FAUGHT & C. J. PILLING.
APPARATUS FOR MEASURING AND INDICATING BLOOD PRESSURE.
APPLICATION FILED SEPT. 20, 1910.
1,089,122.
Patented Mar. 3, 1914.
3 SHEETS—SHEET 2.
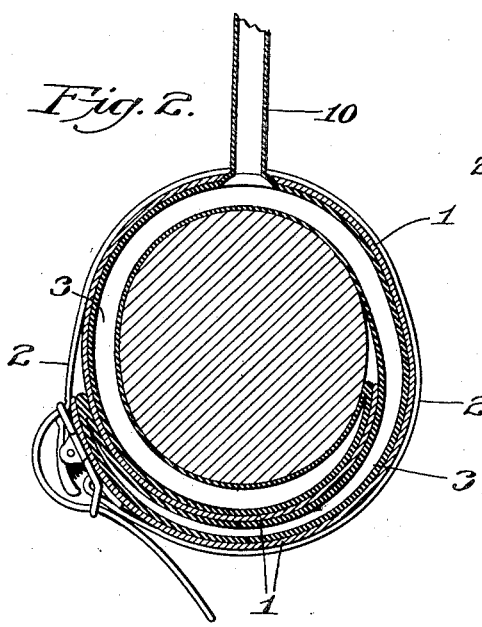
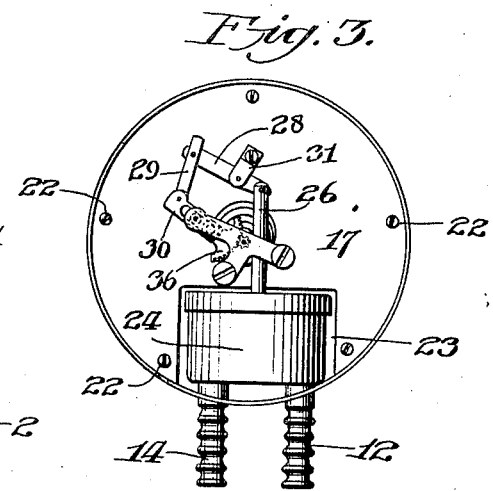
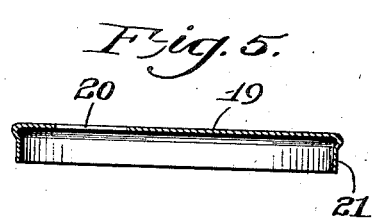
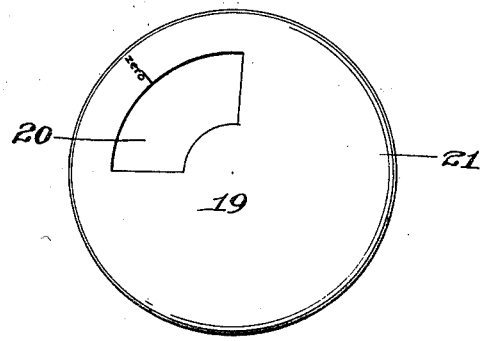
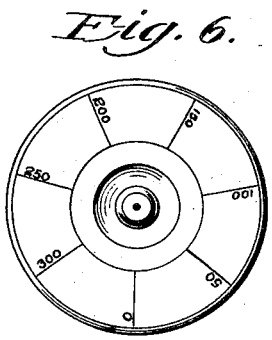

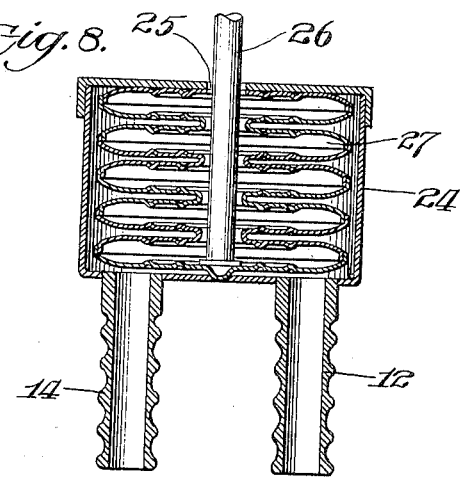
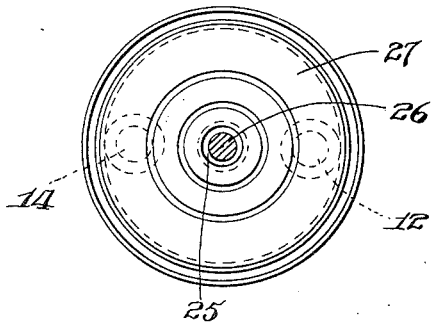
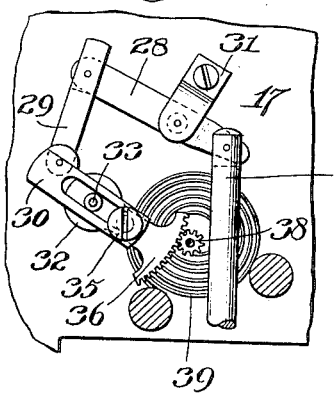
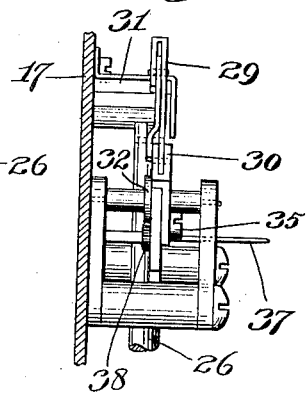
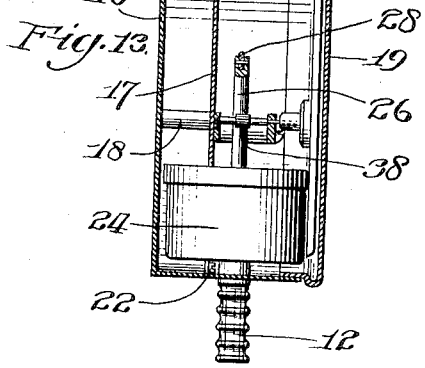
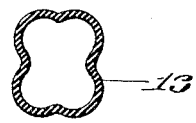
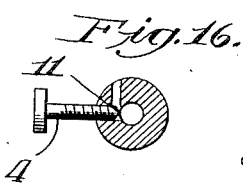

UNITED STATES PATENT OFFICE.

FRANCIS ASHLEY FAUGHT AND CHARLES J. PILLING, OF PHILADELPHIA, PENNSYLVANIA, ASSIGNORS TO GEORGE P. PILLING AND SON COMPANY, OF PHILADELPHIA, PENNSYLVANIA, A CORPORATION OF PENNSYLVANIA.

APPARATUS FOR MEASURING AND INDICATING BLOOD-PRESSURE.

1,089,122.   Specification of Letters Patent.   Patented Mar. 3, 1914.

Application filed September 20, 1910. Serial No. 582,825.

*To all whom it may concern:*

Be it known that we, FRANCIS ASHLEY FAUGHT and CHARLES J. PILLING, citizens of the United States, residing in the city of Philadelphia, State of Pennsylvania, have jointly invented certain new and useful Improvements in Apparatus for Measuring and Indicating Blood-Pressure, of which the following is a full, clear, and exact description, reference being had to the accompanying drawings, forming a part of this specification.

Our invention relates to apparatus designed for use in medical and pathological diagnosis, for measuring and indicating the degree of blood pressure in an artery of the human body, to determine it as a clinical factor in aid of correct diagnosis, such determination being of great value in the treatment of diseases of the blood, blood vascular system, and kidneys. Heretofore such determinations have been and are now commonly made by instruments in which the blood pressure is indicated by producing an air pressure on a column of mercury, as in a manometer or the like, and causing such air pressure to equal or rather slightly exceed the blood pressure in the artery, the actual pressure of which is indicated on the manometer scale at the moment of its release after constriction as by a tourniquet for example.

Our present invention is an apparatus to determine such blood pressure by means embodying the principle of a rotatable dial-carrying spindle actuated, through appropriate mechanism, by air compression devices, the scale on the movable dial member being marked to correspond with a manometer pressure scale.

In the accompanying drawings illustrating our invention:—Figure 1 is an elevation of the complete apparatus and its operating adjuncts, shown applied to the arm of a patient, and ready for use. Fig. 2 is a section through the constriction device, on the line *a—b* of Fig. 1. Fig. 3 is an enlarged plan view of the rotatable dial-actuating device, with the superposed fixed dial plate which may form the outside protecting cover of the containing casing, removed. Fig. 4 is a plan view of the fixed dial plate, detached, and Fig. 5 is a section thereof. Fig. 6 is a plan view of the rotatable dial, detached, and Fig. 7 a section thereof. Fig. 8 is a longitudinal section, partly in elevation, of the air compressed device including its containing closed air-chamber; and Fig. 9 is a plan thereof with cover removed. Fig. 10 is a vertical section, of the dial-spindle actuating device; Fig. 11 is a plan view of part of the same, illustrating the segmental rack and its link mechanism, actuating the dial spindle through the toothed pinion thereon; and Fig. 12 is a side elevation thereof. Fig. 13 is a section of the dial casing and part of its containing mechanism, illustrating some parts not shown in the other views. Fig. 14 is a section of the expansible air-tube, in normal state; Fig. 15 a like view of same in expanded state; and Fig. 16 is a section, partly in elevation, of the air-releasing needle-valve on the lower end of the air-compressing piston cylinder.

Referring now to said drawings, the constriction element is shown in Fig. 1 and is of a form and character well known as a "constriction cuff", and consists, briefly stated, of an outer leather band 1, with fastening straps 2, 2; while inside the straps is a detached expansible rubber lining formed like a bag, indicated at 3 in Fig. 2 and by dotted lines in Fig. 1, and leading therefrom and through the outer leather cuff is a rubber tube 10.

The air-compressing piston cylinder is of common construction, and consists briefly stated, of a cylinder 5, having a pair of exterior finger holds 6, a piston 7 controlled by a spring 7ª, and actuated by a piston rod 8 provided with a handle 9.

On the lower end of the piston cylinder is a nipple supplied with a needle valve 11, shown in section in Fig. 16. An ordinary rubber tube 10 leads from the constriction cuff to the nipple 12 of one air-port of the dial-actuating device, and a special character, though known in other devices, of rubber tubing, indicated at 13 in Fig. 1 and shown in section in Figs. 14 and 15, leads from the nipple of the piston cylinder to the nipple 14 of the other of the pair of air ports of the dial-actuating device. These two air-port nipples 12 and 14 are indicated by like letters of reference in Figs. 3 and 8.

The pressure-indicating device shown in elevation in Fig. 1 we will now describe in detail; as it constitutes a wholly novel element in the new combination with the other and individually-old elements already described.

The casing is shown in Fig. 13 as comprising a shallow cylinder 15 with a closed basal head 16, and interiorly a false bottom 17 supported on and secured to pillars 18 by screws 22; and the casing is detachably closed by a top head 19 in the form of a removable cap with a flange rim 21, having a segmental opening 20 (see Figs. 4 and 5). These specific forms are however preferential only, as various other forms may be utilized. The longer arc of this segmental opening is marked at its exact center with a zero mark, as shown in said Fig. 4.

The false bottom 17 of the casing is cut away, as at 23, see Fig. 3, to admit a closed chamber 24 from the outer head of which proceed the two air-tube nipples 12 and 14. The other head of the chamber is apertured at 25 to freely allow required movement of a rod 26. Within the closed chamber 24 is mounted a bellows 27 consisting of convexed spaced plates, apertured centrally and connected together at the coinciding rims of adjacent apertures so as to form an operatively air-tight collapsible body operating as an air-compressed device. Its convex plates are corrugated annularly to prevent collapse. Its upper plate bears against the upper head of the chamber 24 and its lower plate bears against the outer or lower head of said chamber. The lower end of rod 26 is fastened to the lower plate of said bellows device and its end projects through the aperture 25 as before stated.

Pivotally connected to the free end of rod 26 is a series of jointed links 28, 29 and 30, (see Fig. 11); the link 28 having a fixed bearing 31. The link 30 is slotted to admit the end of a pin 33 by which it is guided in its oscillation, the upper end of said pin being fixed in a superposed bearing 34 (removed from Fig. 11 and shown in plan view in Fig. 3). A segmental rack 36 forms the free terminal end of the lever-link 30. A disk 32 embraces the pin 33, and an adjusting screw 35 in the slot of the lever 30 enables adjustment to be made in the arc of oscillation of the segmental rack. A rotatable spindle 37 has a lower bearing in the false bottom 17, and carries a pinion 38 which meshes with the said segmental rack 36. A spring 39 is coiled around the spindle 37 near its base and operates to cause a partial rotation of the spindle to normal position, that is to say, after it has been partially rotated in the opposite direction, in the operation of the apparatus, through the movement of said segmental rack.

The operation of the apparatus, as a whole, is as follows: The constriction cuff being applied as usual over an accessible artery, as on the upper arm, see Fig. 1, the air-pump piston is depressed, repeatedly, to drive a column of air under pressure so created, through the flexible corrugated air-tube, to the inlet nipple 14 of the closed air-chamber 24, wherein it operates, as the air-pressure rises, by externally acting on the bellows to collapse them and thereby actuate the rod 26 and connected dial-actuating mechanism, but the compressed air-pressure extends out through discharge nipple 12 and connecting tube 10, to the constriction device. This air-compression device is exceedingly sensitive and it is important that the air-pressure should be delivered constantly and not intermittently nor with sudden shock, hence a corrugated rubber tube 13 is employed between the initial source of air supply and the dial-actuating mechanism, with the result that the tube 13 which in normal condition is shown in section in Fig. 14, is first expanded by the pressure of the air-current to the form shown in section in Fig. 15, hence absorbing the shock and eliminating the impact effect which would otherwise be imposed on the dial-actuating mechanism. Increase of the air pressure, in the manner stated, will cause a partial rotation of the dial spindle, carrying its scale figures into marking relation to the zero mark on the fixed dial plate, while the constriction cuff is being inflated. When constriction of the artery is complete, and ascertained by noting the absence of any perceptible pulse, then the operator releases the excess of compressed air by moving the screw 4 of the needle-valve (Fig. 16), opening passage 11 therein, until the first pulse beat is felt, at which moment the rotatable dial, relatively to zero mark on the dial plate, will indicate the exact normal pressure of blood in the artery. The observation having been made, and the air fully released, the spring on the dial spindle causes a partial rotation of it, in the opposite direction, carrying with it the dial, to normal position, ready for any repetition of the operation when desired.

Having thus described our invention, we claim as new and desire to secure by Letters Patent:—

1. Apparatus for measuring and indicating arterial blood pressure comprising, in combination, the following instrumentalities, namely, a source of air supply, a constriction device, a mechanically operating pressure gage interposed between said elements, a plurality of independent tubular means operatively connecting said gage device with the source of air supply and with the constriction device through said pressure gage, and a sensitive release valve governing said tubular means, said pressure gage comprising a substantially closed air chamber with dial actuating mechanism mounted therein adapted to be actuated in both directions by the increase and decrease respectively in pressure of the volume of air on its passage through said air chamber in opposite directions alternately.

2. Apparatus for measuring and indicating arterial blood pressure consisting of the combination with a source of air supply and a constriction device of a mechanically operating pressure gage interposed between said elements and comprising a substantially closed air chamber with air inlet and discharge ports, independent tubular connections between the source of air supply and one of said ports and between the other of said ports and the constriction device, said gage element including dial actuating mechanism actuated by rise and fall in pressure of the air passing through said air chamber in both directions, and a sensitive valve governing the release of the pressure therein to reduce it to equilibrio with the arterial pressure.

3. Apparatus for measuring and indicating arterial blood pressure comprising in combination a source of air supply, a constriction device, a release valve, a mechanically operating pressure gage including a substantially closed air chamber and a dial actuating mechanism therein adapted to be actuated in both directions by rise and fall in air pressure in said chamber, a tubular connection between said air chamber and the constriction device and a flexible tube which is corrugated in cross section and directly connects said air chamber of the pressure gage with the primary source of air supply.

4. Apparatus of the class recited comprising a fixed dial plate, a dial, a rotatable spindle carrying said dial, and air-actuated mechanism within the casing operating to rotate said dial spindle, said mechanism including a closed chamber having air-inlet and discharge ports and operating primarily as a passageway for compressed air, a bellows device within the chamber actuated by compressed air passing through said chamber, and connecting actuating mechanism between said bellows device and said dial-carrying spindle, operating to impart a rotary movement to the dial relatively to the dial plate.

5. An apparatus of the class recited comprising in combination a containing casing, a fixed dial plate having a segmental opening, a disk-shaped pressure-scale dial, disposed in operative relation to said fixed dial plate, a rotatable spindle on which said dial is mounted, compressed-air actuated mechanism including a bellows device and a closed chamber therefor, mounted in said casing, mechanism, actuated by said bellows device to cause a partial rotation of said spindle in one direction, said mechanism also including means to cause an opposite rotative movement of the spindle to normal position when the supply of compressed air acting on the bellows is released.

6. An apparatus of the class described comprising a casing, a bellows chamber, said chamber having a plurality of openings in a wall thereof, a pair of nipples in said openings adapted to lead a volume of compressed air to and from said chamber, a metallic bellows in said chamber adapted to be actuated by said volume of compressed air, a rod and a connected series of links including a segmental rack, actuated by said bellows, a rotatable spindle with a pinion thereon meshing with said rack, a dial mounted on said spindle, and a superposed dial plate in operative relation to said dial.

7. An apparatus of the class recited comprising in combination a containing casing, a dial-plate, a dial mounted in operative relation thereto, a rotatable spindle carrying said dial, a pinion on the spindle, mechanism including a segmental rack meshing with said pinion, to rotate the spindle in one direction, resilient means to restore the dial to normal position, means to vary its arc of rotation, a closed air-chamber, a plurality of tubular nipples adapted to lead compressed air to and from said chamber, a metallic bellows in said chamber actuated solely by compressed air admitted to said chamber, and connecting actuating devices between said bellows and the mechanism aforesaid which directly impart rotative movement to the dial spindle.

8. Apparatus of the class recited, comprising in combination a containing casing, a dial and dial-plate, means to operatively support and to impart a rotary motion to said dial, means to create a volume of compressed air as the sole means of directly operating said dial-actuating mechanism, said means comprising a closed air-chamber provided with a pair of tubular nipples adapted to lead a volume of compressed air to and from the same, a metallic bellows device in said chamber composed of a series of pairs of centrally-apertured convex plates, united at their rims in oppositely-disposed relation, forming a series of air-chambers communicating with each other through said coinciding central apertures, with connecting actuating devices adapted to impart the motion of said bellows-plates to said dial-actuating mechanism.

In testimony whereof, we have hereunto affixed our signatures this sixth day of September A. D. 1910.

FRANCIS ASHLEY FAUGHT.
CHARLES J. PILLING.

Witnesses:
A. M. BIDDLE,
R. A. DUNLAP.